Patented Jan. 16, 1923.

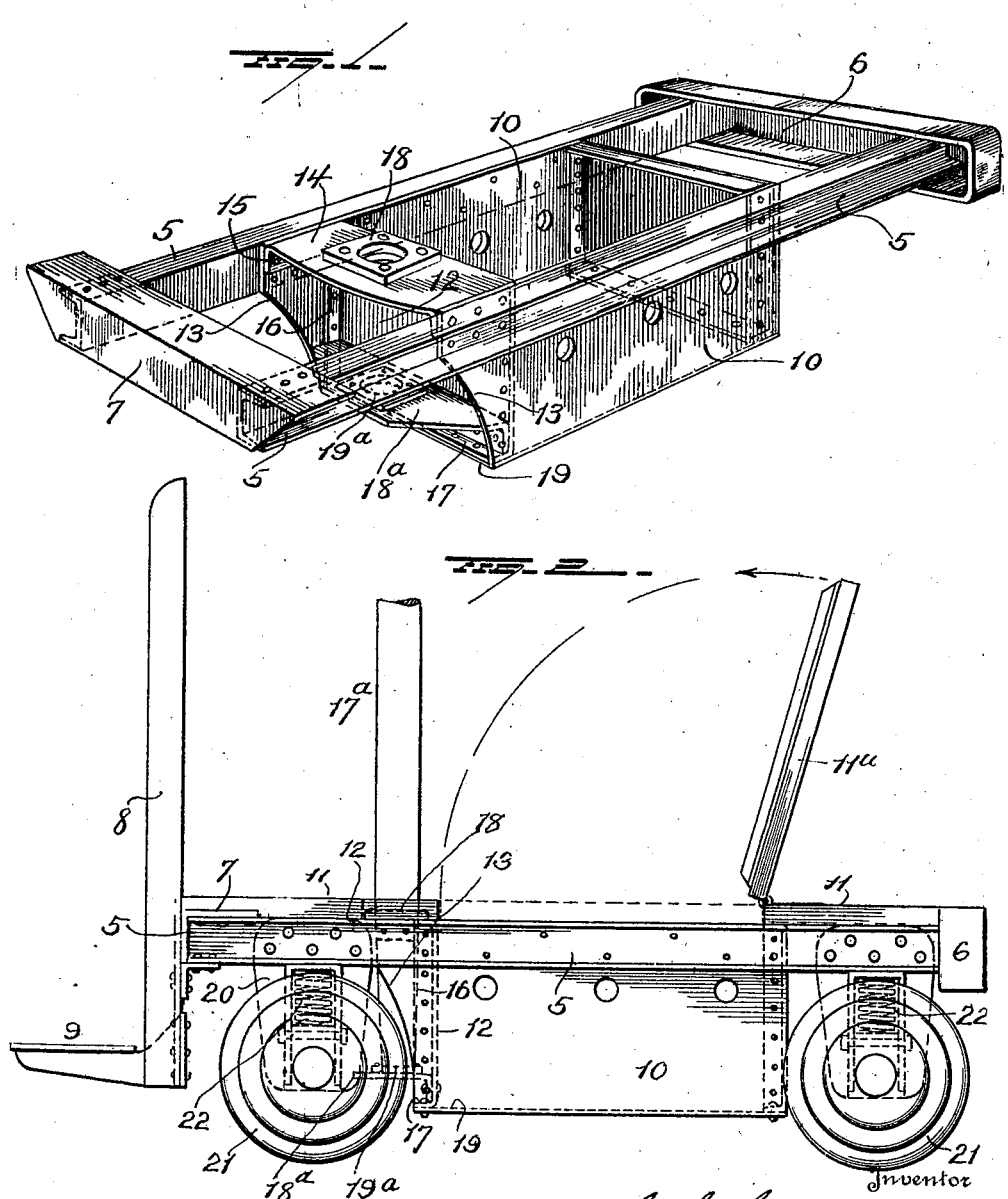

1,442,099

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

FRAME CONSTRUCTION FOR INDUSTRIAL TRUCKS.

Application filed October 19, 1921. Serial No. 508,801.

*To all whom it may concern:*

Be it known that I, CHARLES S. SCHROEDER, a citizen of the United States, and a resident of Stamford, in the county of Fairfield and State of Connecticut, have invented certain new and useful Improvements in Frame Constructions for Industrial Trucks; and I do hereby declare the following to be a full, clear, and exact description of the invention, such as will enable others skilled in the art to which it appertains to make and use the same.

My invention relates to the frame construction of industrial trucks, the object being to produce a strong and rigid frame that will be light in weight and low in cost, by utilizing members that are normally dead weight, to strengthen a relatively light frame.

A further object is to provide simple means for supporting the mast of a crane or other auxiliary device, used on trucks, that will be strong and rigid enough to withstand all strains to which it may be subjected, the said supporting means being so arranged that it may be attached to any standard truck without the aid of elaborate tool equipment.

Heretofore the common practice on this type of vehicles has been to so dispose the battery container as to make it a burden on the frame instead of a reinforcement. With my improvement the battery container or box is so constructed and located as to greatly strengthen the frame against bending and torsional strains, and also provide a support for auxiliary equipment such as a crane mast that imposes great bending moments on its support, and which without the help of the battery compartment reinforcement, would require a much heavier truck frame to support it.

In the accompanying drawings, Figure 1 is a view in perspective of a truck frame embodying my invention, and Figure 2 is a view in side elevation of the same.

5 represents the metal side member of the truck side frame preferably made of channel section connected at the rear by a pressed steel bumper 6, and at the front by the L-shaped angle member 7 to which the uprights 8 carrying the operator's platform 9 is secured.

Located between and secured to the inner faces of the side members 5, is the battery box or container 10, the side and also the end members of which are riveted to the said side members 5 thus solidly uniting and stiffening and bracing the two side members intermediate their ends and immediately under the load carrying platform 11 which as shown in Figure 2 is secured on said side members 5.

The two side members of the battery box or container 10, are continued forward in advance of the front end member 12 thereof, as at 13, and are widened upwardly thus forming a support and brace for the forwardly bent end 14 of the front end 12 of the box 10, which forwardly bent end is provided with downwardly turned side flanges 15 which are riveted to the widened upper ends of the projecting ends 13 of the side members of the box and also to the side members 5 of the truck frame. The side edges of the front end 12 of the container are flanged as at 16 which flanges are riveted to the side members of the container, and it is also flanged at its lower end as at 17, which flange is riveted to the bottom member 19 of the container.

The construction above described forms a stiff and rigid front end to the container, which with the container itself riveted to the side members 5 of the truck frame, strengthens the latter both in bending and in torsion, while the upper horizontal flange of said front end provides a support for the mast 17ª of a crane when the latter is employed, or for any auxiliary equipment that may be used.

When a mast or similar device is used the top flange 14 of the front plate 12 is provided with an opening for the passage of the mast, the opening being reinforced by the plate 18 secured to the upper face of flange 15, and a bottom support or shelf 18ª is employed for supporting the lower end thereon as shown in Figure 2. This shelf is flanged at its rear end and riveted to the front end 12 of the container, with the lower edge of said flange preferably resting on the bottom flange 17 of the front end plate 12. This shelf carries a seat 19ª in or on which the lower end of the mast is mounted and which may operate as a support for the mast or simply as a brace or guide therefor, the mast being supported on the upper flange 14.

The rear end of the container is also flanged and riveted to the sides of the container and to the side members 5 of the truck, so that the container instead of being simply a dead weight and without assisting in strengthening the truck frame, is a reinforcement therefor and braces the latter intermediate the wheels, thus producing a frame that is exceedingly strong and rigid, without adding to the weight thereof.

The platform 11 which is secured to the side members 5, constitutes the load carrying platform of the truck and is provided with a central hinged section 11ª which when opened as shown in Figure 2 affords ready access to the battery container.

Rigidly secured to the underside of the side members 5 of the frame adjacent the two ends thereof are the wheel pedestals 20 in which the bearings carrying the wheels 21 supporting the truck are mounted, the said bearings being preferably sustained by the coiled springs 22 located within the pedestals or wheel supporting standards.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a frame for trucks, the combination of metal side members and a metal battery container riveted to said members and provided with a reinforced and projecting front end and a mast mounted in said projecting end.

2. In a frame for trucks, the combination of metal side members and a metal container riveted thereto, the front end of said container having an integral forwardly projecting top flange riveted to the side members of the frame, and a mast supported by said projecting top flange.

3. In a frame for trucks, the combination of metal side members and a metal container riveted thereto, the front end of said container having forwardly projecting sides and forwardly projecting top flange integral with the front member of the container, the said top flange being riveted to the side members of the frame and also to the projecting ends of the side members, and provided with an opening to receive a mast, and a seat below said opening for the lower end of the mast.

4. In a frame for trucks, the combination of metal side members mounted on wheels, a metal container depending from said side members and riveted thereto, the front end of said container having an integral forwardly projecting top flange riveted to the frame, and a mast passing through said top flange and resting on a support below the latter.

5. In a frame for trucks, the combination of metal side members, a metal container depending from and riveted to said side members, the front end of the container being reinforced, the said reinforcement being secured to the side members, a platform on said side members, the portion of the platform above the container being hinged to open upwardly whereby access may be had to the container, and a mast passing through that part of the platform in front of the hinged section of the latter and supported by the reinforced front end of the container.

6. In a frame for trucks, the combination of metal side members, a metal container depending from and riveted to said side members, a platform on said side members, a portion of the platform above the container being hinged to open upwardly whereby access may be had to the container and a mast passing through that part of the platform in front of the hinged section of the latter and supported by bearings carried by the front end of the container.

7. In a truck, the combination of metal side members, a metal container riveted to said side members, a platform on said side members and a mast passing through said platform and supported by bearings connected with the front end of the container.

8. In a truck frame, the combination of metal side members supported on wheels, a metal container depending from said side members and riveted thereto, a forwardly projecting horizontal shelf or support at the front end of the container at the top thereof the said shelf or support being secured to the front member of the container and to the side members of the frame, and a lower shelf or support riveted to the container in a plane below the top shelf or support, and a crane mast carried by said shelves or supports.

In testimony whereof, I have signed this specification in the presence of two subscribing witnesses.

CHARLES S. SCHROEDER.

Witnesses:
 CHARLES A. BERRY,
 HAROLD E. NAGLE.